United States Patent
Brownlie et al.

(10) Patent No.: US 8,967,931 B1
(45) Date of Patent: Mar. 3, 2015

(54) APPARATUS FOR SECURING CARGO

(71) Applicants: Troy Brownlie, Rives Junction, MI (US); John Raut, Jackson, MI (US)

(72) Inventors: Troy Brownlie, Rives Junction, MI (US); John Raut, Jackson, MI (US)

( * ) Notice: Subject to any disclaimer, the term of this patent is extended or adjusted under 35 U.S.C. 154(b) by 0 days.

(21) Appl. No.: 14/066,728

(22) Filed: Oct. 30, 2013

(51) Int. Cl.
  *B60P 7/15* (2006.01)
  *B61H 13/00* (2006.01)

(52) U.S. Cl.
  CPC ........................................ *B60P 7/15* (2013.01)
  USPC ................ 410/121; 188/32; 188/36; 414/401

(58) Field of Classification Search
  CPC ...... B60P 7/0892; B60P 1/003; B60P 7/0807; B60P 7/15; B60R 7/02; B61D 45/006; B61D 45/001; B61D 45/00; B61D 45/008; B61D 17/046; B61D 17/06; B61D 3/08; B61D 3/18; B61D 45/002; H05B 33/0806; Y02B 20/72; Y02T 30/30; Y10S 224/925
  USPC .......... 410/121, 127, 129, 140, 151, 128, 143
  See application file for complete search history.

(56) References Cited

U.S. PATENT DOCUMENTS

| | | | |
|---|---|---|---|
| 3,902,574 A * | 9/1975 | Wright | 188/4 R |
| 4,144,951 A * | 3/1979 | Rea | 188/32 |
| 4,217,831 A * | 8/1980 | Koliba et al. | 410/121 |
| 4,737,056 A * | 4/1988 | Hunt | 410/151 |
| 4,842,460 A | 6/1989 | Schlesch | |
| 4,917,219 A * | 4/1990 | Henry | 188/32 |
| 5,549,428 A | 8/1996 | Yeatts | |
| 5,697,742 A | 12/1997 | House | |
| 6,176,657 B1 | 1/2001 | Romph | |
| 6,511,270 B1 | 1/2003 | Burke et al. | |
| 6,648,569 B2 | 11/2003 | Douglass et al. | |
| 7,264,092 B2 * | 9/2007 | Jette | 188/36 |

\* cited by examiner

*Primary Examiner* — Glenn Dayoan
*Assistant Examiner* — Sunsurraye Westbrook
(74) *Attorney, Agent, or Firm* — Young Basile Hanlon & MacFarlane P.C.

(57) ABSTRACT

An apparatus for securing a cargo item within a cargo area that is defined by a pickup truck bed and a bed liner that is disposed within the pickup truck bed, the bed liner defining a plurality of elongate grooves. The apparatus includes a rod that extends along an axis in an axial direction of the rod. An engaging structure is receivable within at least one groove from the plurality of elongate grooves of the bed liner for engagement with the bed liner. An adjustable connecting structure connects the engaging structure to the rod and allows adjustment of an axial position of the engaging structure along the rod in the axial direction of the rod. A body is connected to the rod for engaging the cargo item.

18 Claims, 4 Drawing Sheets

APPARATUS FOR SECURING CARGO

BACKGROUND

Motor Vehicles are routinely used to transport cargo items of all types. In some situations, it is advisable to prevent cargo items from shifting within the cargo area of a motor vehicle. Well known examples of cargo securement include fixing the cargo item to a part of the vehicle using straps or ropes, or bracing the cargo item using another object.

In some situations, there are few good options for conveniently securing a cargo item. A notable example pertains to the cargo area (i.e. the "bed") of a pickup truck in which a rigid or semi-rigid bed liner is installed. Although some prior devices have attempted to utilize structures that engage grooves formed in a bed liner, the position of the device is dependent on the groove size and spacing. As a result, the devices cannot always be positioned snugly against the cargo item.

SUMMARY

Apparatuses for securing cargo are described herein.

One aspect of the disclosed embodiments is an apparatus for securing cargo within a cargo area that is defined by a pickup truck bed and a bed liner that is disposed within the pickup truck bed, the bed liner defining a plurality of elongate grooves. The apparatus includes a rod that extends along an axis in an axial direction of the rod. An engaging structure is receivable within at least one groove from the plurality of elongate grooves of the bed liner for engagement with the bed liner. An adjustable connecting structure connects the engaging structure to the rod and allows adjustment of an axial position of the engaging structure along the rod in the axial direction of the rod. A body is connected to the rod for engaging the cargo item.

Another aspect of the disclosed embodiments is an apparatus for securing a cargo item within a cargo area that is defined by a pickup truck bed and a bed liner that is disposed within the pickup truck bed, the bed liner defining a plurality of elongate grooves. The apparatus includes a rod that extends along an axis in an axial direction of the rod. An engaging structure is receivable within at least one groove from the plurality of elongate grooves of the bed liner for engagement with the bed liner. A clamping sleeve connected the engaging structure to the rod. The clamping sleeve is moveable between a clamped position and an unclamped position with respect to the rod. An axial position of the engaging structure with respect to the rod along the axis of the rod and a rotational position of the engaging structure with respect to the rod about the axis of the rod are fixed when the clamping sleeve is in the clamped position. The axial position of the engaging structure with respect to the rod and the rotational position of the engaging structure with respect to the rod are not fixed when the clamping sleeve is in the unclamped position. A body is connected to the rod for engaging the cargo item.

Another aspect of the disclosed embodiments is an apparatus for securing a cargo item within a cargo area that is defined by a pickup truck bed and a bed liner that is disposed within the pickup truck bed, the bed liner defining a plurality of elongate grooves. The apparatus includes a rod that extends along an axis in an axial direction of the rod. An engaging structure is receivable within at least one groove from the plurality of elongate grooves of the bed liner for engagement with the bed liner. An adjustable connecting structure connects the engaging structure to the rod and allowing adjustment of at least one of an axial position of the engaging structure along the rod in the axial direction of the rod or a rotational position of the engaging structure with respect to the rod about the axis of the rod. The apparatus also includes body for engaging the cargo item, wherein the body includes at least a first surface for engaging the cargo item and a second surface for engaging the cargo item. A pivot joint includes an axle for pivotally connecting the rod to the body. The pivot joint allows pivoting of the body between at least a first angular position with respect to the rod and a second angular position with respect to the rod, the first surface of the body being positioned for engagement with the cargo item when the body is disposed in the first angular position with respect to the rod, and the second surface of the body being positioned for engagement with the cargo item when the body is disposed in the second angular position with respect to the rod.

BRIEF DESCRIPTION OF THE DRAWINGS

The description herein makes reference to the accompanying drawings wherein like referenced numerals refer to like parts throughout several views and wherein.

DETAILED DESCRIPTION

Apparatuses for securing cargo that are described herein are adapted to be utilized on cargo supporting surfaces that have grooves defined in them. The apparatuses described herein can include a rod, an engaging structure that is connected to the rod and receivable within a groove, and a body connected to the rod for engaging the cargo item. The rod can be connected to the engaging structure by an adjustable connecting structure to adjust an axial position and/or a rotational position of the engaging structure with respect to the rod, such that the distance between the rod and the body can be changed, thereby allowing snug engagement and appropriate application of pressure to a cargo item to prevent shifting of the cargo item.

Figure 1:
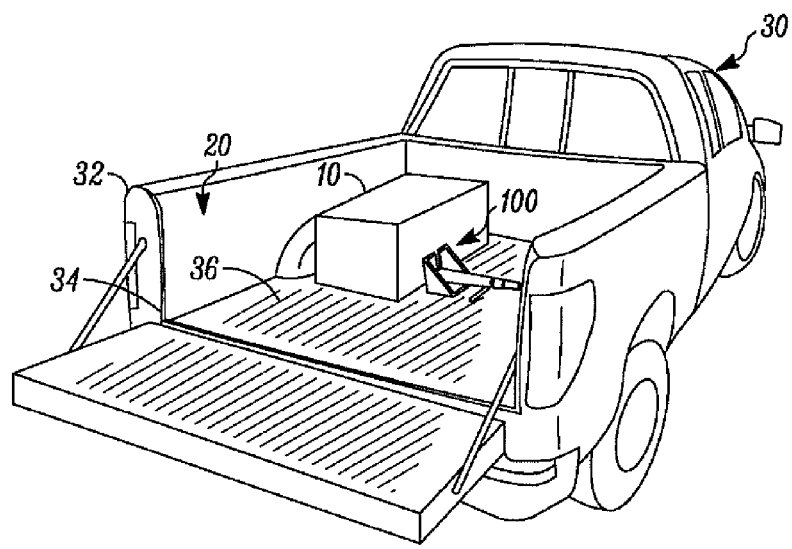
FIG. 1 is a perspective view showing an apparatus for securing cargo installed in a cargo area of a vehicle and in engagement with a cargo item.

FIG. 1 shows an apparatus 100 for securing a cargo item 10 within a cargo area 20. In the illustrated example, the cargo area 20 is defined by structures associated with a vehicle such as a pickup truck 30, including a bed liner 34 that is disposed within the truck bed 32. The bed liner 34 includes a plurality of spaced apart grooves 36 that are substantially parallel with respect to one another and extend along the bed liner 34 and a front rear direction with respect to the pickup truck 30.

The apparatus 100 is adapted to engage the cargo item 10 to secure the cargo item 10 within the cargo area 20. In order to apply pressure to the cargo item 10 such that the apparatus 100 securely and snugly engages the cargo item, the apparatus 100 also engages a structure associated with the cargo area 20, such as the grooves 36 defined by the bed liner 34 that is disposed within the truck bed 32 of the pickup truck 30.

Figure 2:
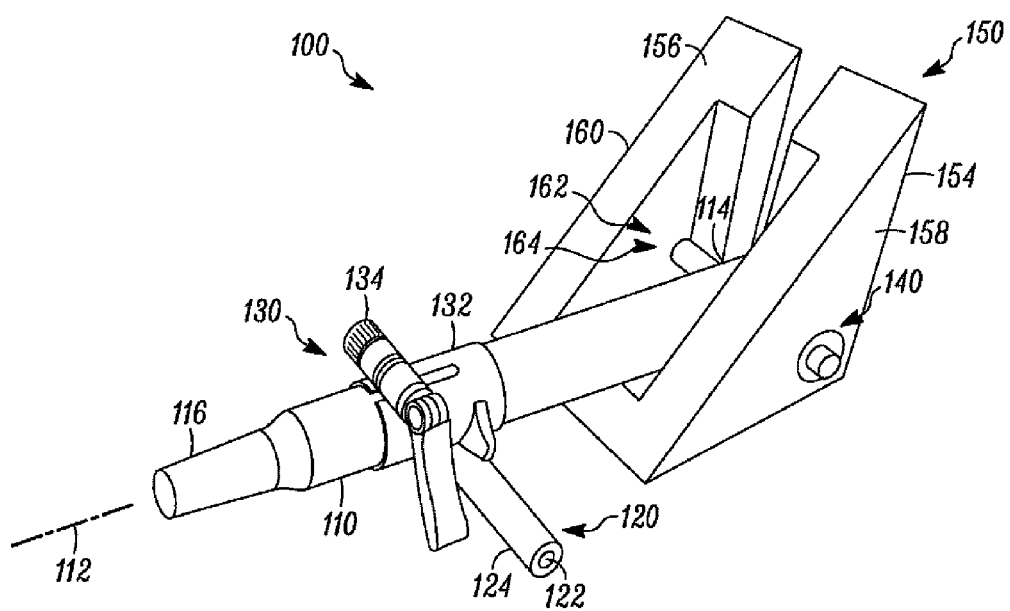
FIG. 2 is a perspective view showing the apparatus for securing cargo in a first configuration.
Figure 3:
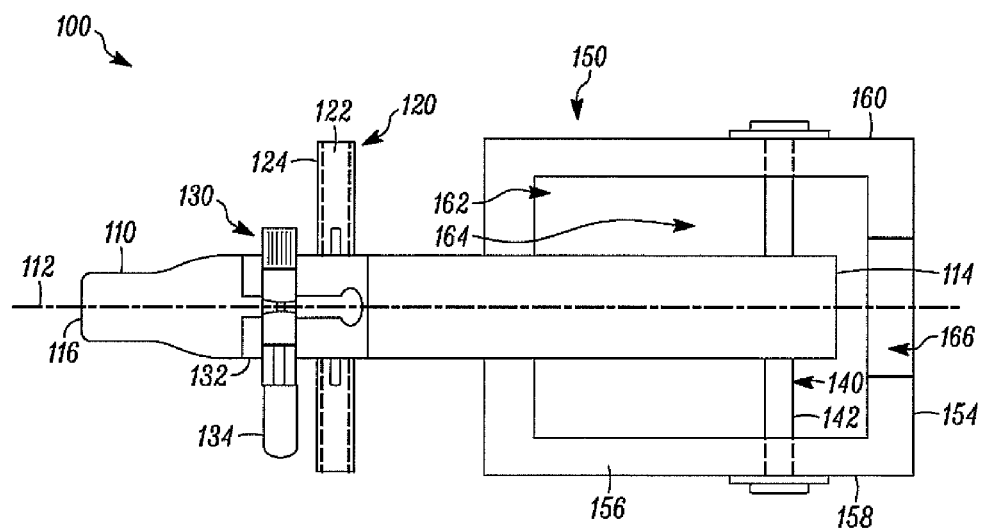
FIG. 3 is a top view showing the apparatus for securing cargo in the first configuration.

As shown in FIGS. 2-3, the apparatus 100 includes a rod 110, an engaging structure 120, an adjustable connecting structure 130, a pivot joint 140 and a body 150.

The rod 110 extends along a rod axis 112, in a direction that will be referred to herein as an axial direction of the rod 110. The rod 110 extends from a first end 114, at which the rod 110 is connected to the body 150, to a second end 116 opposite the body. In the illustrated example, the rod 110 is substantially cylindrical, having a circular cross section with a constant outside diameter over at least a portion of the axial length of the rod 110. It should be understood, however, that other geometric configurations can be adopted for the rod 110. For example, the rod 110 could have a square or rectangular cross sectional shape. The rod 110 can be formed from a rigid material, such as metal. Other materials could be utilized for the rod 110. The rod 110 can be hollow, or the rod 110 can be solid.

The engaging structure 120 is adapted to engage a structure associated with the cargo area 20. In particular, the engaging structure 120 can be adapted to be received within and engaged in one of the grooves from the plurality of grooves 36 of the bed liner 34 (FIG. 1). The engaging structure 120 can be an elongate member that extends substantially transverse and/or substantially perpendicular to the rod 110 and the rod axis 112. The engaging structure 120 can be or include a resilient material, such as rubber that enhances frictional engagement between the engaging structure 120 and the structure associated with the cargo area 20, such as the grooves 36 of the bed liner 34. In the illustrated example, the engaging structure 120 includes a bar 122 that is formed from a rigid material such as metal and is connected to the adjustable connecting structure 130 by suitable means such as welding or conventional fasteners. A resilient material 124 can be provided on the bar 122 in any suitable form, such as a layer, a coating, or a sheathing.

The adjustable connecting structure 130 is operable to connect the engaging structure 120 to the rod 110. The adjustable connecting structure 130 can allow adjustment of an axial position of the engaging structure 120 along the rod 110 in the axial direction of the rod 110. The adjustable connecting structure 130 can also allow adjustment of a rotational position of the engaging structure 120 with respect to the rod 110 about the rod axis 112 of the rod 110. In the illustrated example, the adjustable connecting structure 130 is in the form of a clamping sleeve that is movable between a clamped position with respect to the rod 110 and an unclamped position with respect to the rod 110. In the clamped position of the adjustable connecting structure 130, the axial position of the engaging structure 120 with respect to the rod 110 and the rotational position of the engaging structure 120 with respect to the rod 110 are fixed. When the adjustable connecting structure 130 is in the unclamped position, the axial position of the engaging structure 120 with respect to the rod 110 and the rotational position of the engaging structure 120 with respect to the rod 110 are not fixed. Thus, when the adjustable connecting structure 130 is moved to the unclamped position, the adjustable connecting structure can be slid along the rod 110 to adjust the axial position of the engaging structure 120, and can be twisted with respect to the rod 110 to adjust the rotational position of the engaging structure 120 with respect to the rod 110.

The adjustable connecting structure 130 can include a split collar 132 and a clamp 134. The split collar 132 allows for a small degree of adjustment of its inside diameter in response to force applied to the split collar 132 by the clamp 134. When the clamp 134 is engaged to constrict the inside diameter of the split collar 132, the adjustable connecting structure 130 is in the clamped position. When the clamp 134 is operated to release the forces acting on the split collar 132 and thereby relax (i.e. enlarge) the inside diameter of the split collar 132, the adjustable connecting structure 130 is in the unclamped position. Any type of clamping structure can be provided as the clamp 134. In the illustrated example, the clamp 134 includes a fastener that interconnects two portions of the split collar 132 and a cam lever that is connected to the fastener and, when rotated, applies or releases force to the split collar 132. Other types of clamping structures can be utilized.

The rod 110 is connected to the body 150. In the illustrated example, the rod 110 is pivotally connected to the body 150 by a pivot joint 140. Pivotal motion of the body with respect to the rod 110 allows the body 150 to be moved between two or more positions with respect to the rod 110. As will be explained further herein, pivoting of the body 150 with respect to the rod 110 can allow the apparatus 100 to be utilized in multiple configurations. In particular, the pivot joint 140 can allow pivoting of the body 150 between at least a first angular position with respect to the rod 110 and at least a second angular position of the body 150 with respect to the rod 110. Additional angular positions of the body with respect to the rod can be established, as will be explained further herein. In the illustrated example, the pivot joint 140 includes an axil 142 that is connected to the rod 110 adjacent to the first end 114 of the rod 110, and is also connected to the body 150. Other types of pivot joints can be utilized to interconnect the rod 110 and the body 150 for pivotal motion of the body 150 with respect to the rod 110.

The body 150 is connected to the rod 110, and is adapted to engage the cargo item 10 in order to secure the cargo item 10 within the cargo area 20. In the illustrated example, the body 150 is substantially wedge-shaped, and, by pivoting with respect to the rod at the pivot joint 140, can define a plurality of configurations for the apparatus 100.

The body 150 can include a first end surface 152, a second end surface 154, a third end surface 156, a first side surface 158, and a second side surface 160. The first end surface 152 and the second end surface 154 are oriented at an angle with respect to one another. In the illustrated example, the first end surface 152 and the second end surface 154 are oriented at a 90 degree angle with respect to one another. The third end surface 156 can be oriented at an angle with respect to each of the first end surface 152 and the second end surface 154. In the illustrated example, the third end surface 156 is oriented at an angle of approximately 60 degrees with respect to the first end surface 152 and an angle of approximately 30 degrees with respect to the second end surface 154. In operation, at least one of the first end surface 152, the second end surface 154, or the third end surface 156 will be in engagement with the cargo item 10, dependent upon the configuration of the apparatus 100. An open side 162 can be defined by the body 150, where the open side 162 is surrounded by the third end surface 156. The open side 162 provides access to a hollow interior 164 of the body 150 at a slot 166 can be formed in the body 150 at the second end surface 154 thereof in order to provide access to the hollow interior 164 of the body 150 through the second end surface 154.

Figure 4:
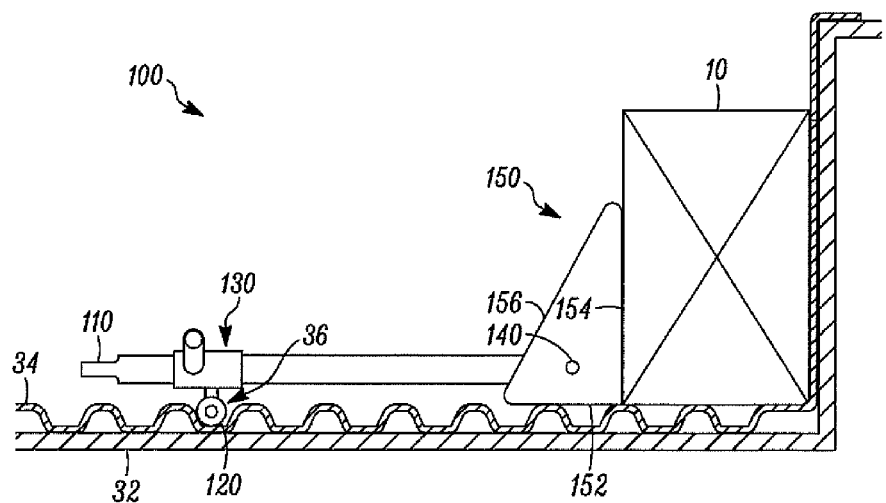
FIG. 4 is a side view showing the apparatus for securing cargo in the first configuration installed in a cargo area of a vehicle and in engagement with a cargo item.

FIG. 4 is a side view showing the apparatus 100 for securing cargo in a first configuration, and installed in the cargo area 20 of the pickup truck 30 in engagement with the cargo item 10. In the first configuration of the apparatus 100, the body 150 is disposed in a first angular orientation with respect to the rod 110, and the adjustable connecting structure 130 is disposed in a first rotational position with respect to the rod 110. In the first configuration, the second end surface 154 of the body 150 is oriented toward and engagement with the cargo item 10, while the first end surface 152 is oriented toward an engagement with a portion of the cargo area 20, such as the bed liner 34, while the rod 110 extends through the open side 162 of the body 150.

Figure 5:
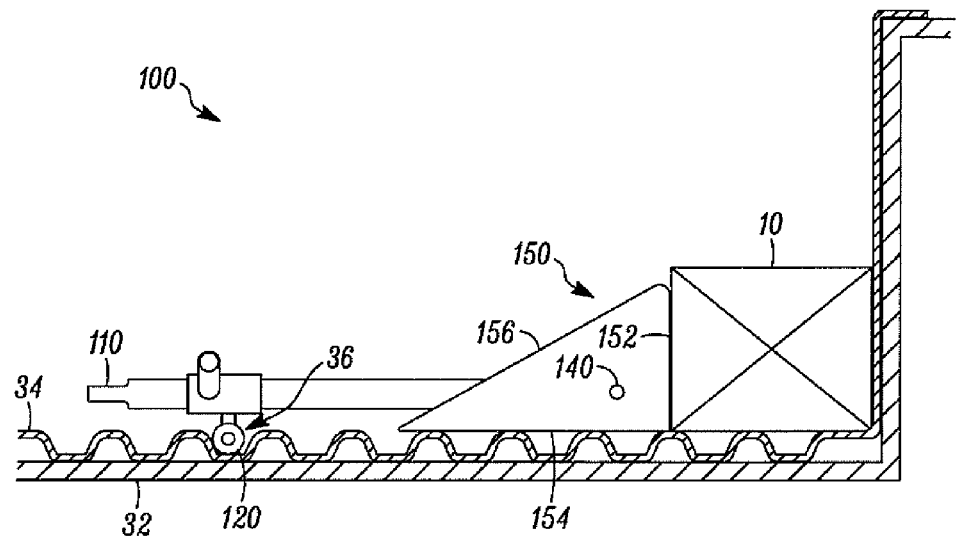
FIG. 5 is a side view showing the apparatus for securing cargo in a second configuration installed in a cargo area of a vehicle and in engagement with a cargo item.

FIG. 5 is a side view showing the apparatus 100 for securing cargo in a second configuration, where the apparatus 100 is disposed in the cargo area 20 of the pickup truck and is in engagement with the cargo item 10. In the second configuration, the body 150 of the apparatus 100 is disposed in a second angular orientation with respect to the rod 110. In particular, the body 150 has been rotated by an angle of approximately 90 degrees with respect to the first angular orientation of the body 150 in the first configuration, as described with respect to FIG. 4. The adjustable connecting structure 130 is disposed in a second rotational position, in which the adjustable connecting structure 130 has been rotated through an angle of approximately 180 degrees with respect to the first rotational position of the adjustable connecting structure 130 with respect to the rod 110 as described in connection with the first configuration and as shown in FIG. 4. In the second configuration, the first end surface 152 of the body 150 is orientated toward and in engagement with the cargo item 10. The second end surface 154 is oriented toward and in engagement with the bed liner 34. The rod 110 extends through the open side 162 of the body 150. In the second configuration, the first end surface 152 extends at approximately a 90 degree angle with respect to the bed liner 34 and the surface of the truck bed 32.

Figure 6:
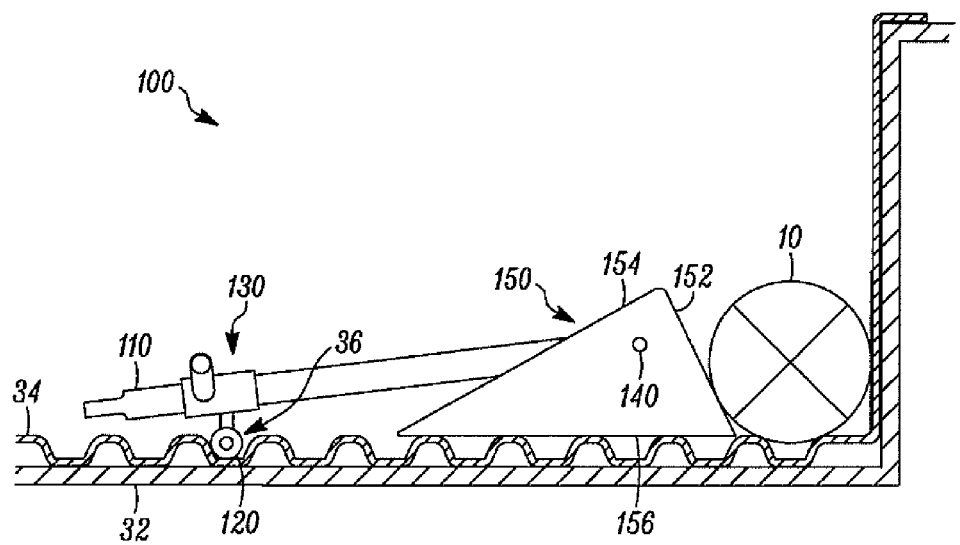
FIG. 6 is a side view showing the apparatus for securing cargo in a third configuration installed in a cargo area of a vehicle and in engagement with a cargo item.

FIG. 6 is a side view showing the apparatus 100 for securing cargo in a third configuration, with the apparatus 100 installed in the cargo area 20 of the pickup truck 30 and in engagement with the cargo item 10. In the third configuration, the body 150 is rotated to a third angular orientation with respect to the rod 110. The adjustable connecting structure 130 is disposed in the first angular orientation, that is, the same angular orientation as in the first configuration as described with respect to FIG. 4. The first end surface 152 is oriented toward and in engagement with the cargo item 10, with first end surface 152 extending at a non-perpendicular angle with respect to the surface of the truck bed 32 and the bed liner 34, such as a 30 degree angle with respect to the truck bed 32 and the bed liner 34, in correspondence with the angle between the first end surface 152 and the third end surface 156. The third end surface 156 is oriented toward and in engagement with the bed liner 34. The rod 110 extends through the slot 166 that is formed through the second end surface 154 of the body 150.

Figure 7:
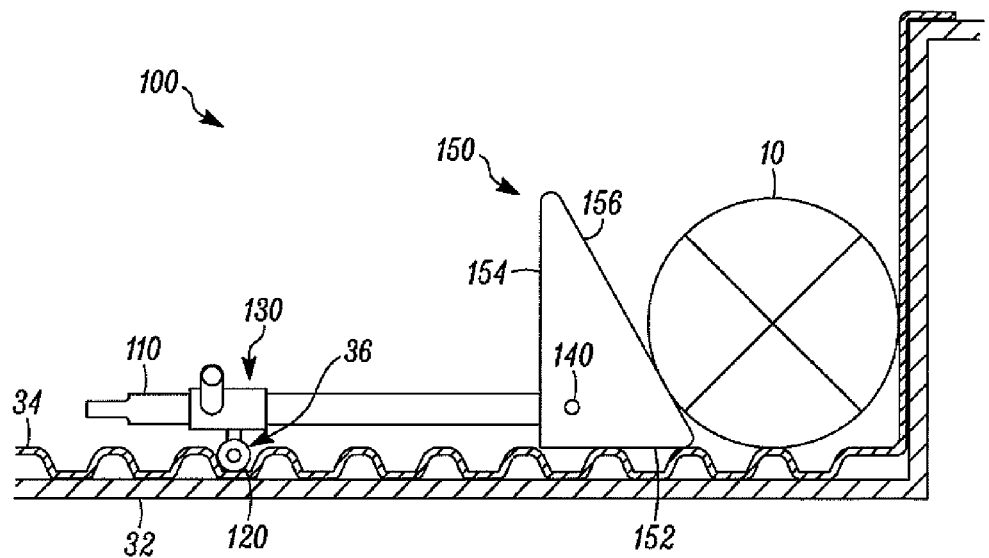
FIG. 7 is a side view showing the apparatus for securing cargo in a fourth configuration installed in a cargo area of a vehicle and in engagement with a cargo item.

FIG. 7 is a side view showing the apparatus 100 for securing cargo in a fourth configuration, where the apparatus 100 is installed in the cargo area 20 of the pickup truck 30 and in engagement with a cargo item 10. In the fourth configuration, the rod 110 is disposed in a fourth angular orientation with respect to the body 150. The adjustable connecting structure 130 is disposed in the second rotational position with respect to the rod 110, as described with respect to the second configuration of the apparatus 100 as shown in FIG. 5. In the fourth configuration, the third end surface 156 of the body 150 is oriented toward and in engagement with the cargo item 10, with the third end surface 156 extending at a non-perpendicular angle with respect to the truck bed 32 and bed liner 34. The first end surface 152 of the body 150 is oriented toward and in engagement with the bed liner 34. The rod 110 extends through the slot 166 that is formed through the second end surface 154.

Figure 8:
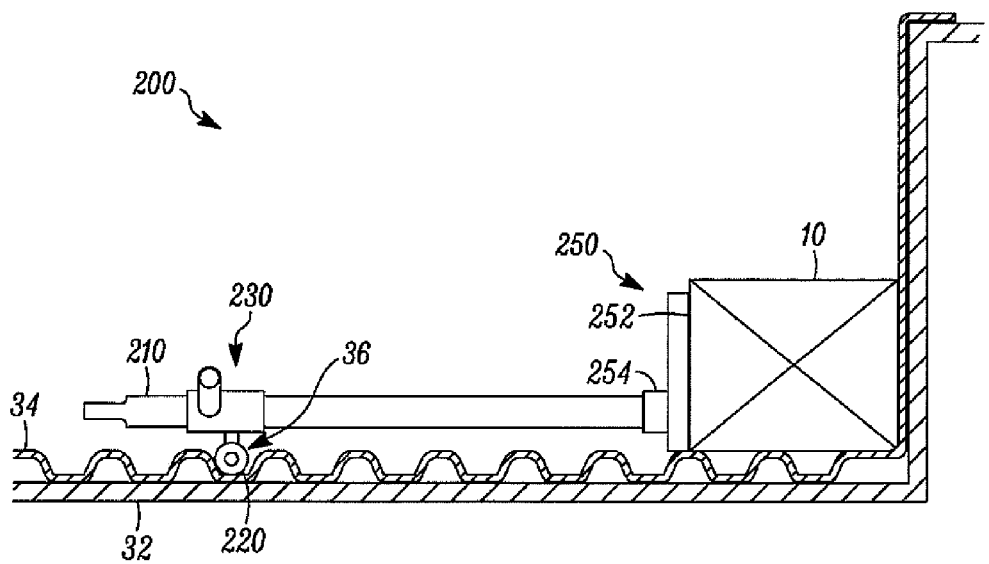
FIG. 8 is a side view showing an alternative apparatus for securing cargo installed in a cargo area of a vehicle and in engagement with a cargo item.

FIG. 8 is a side view showing an alternative apparatus 200 for securing the cargo item 10 with respect to the cargo area 20 of the pickup truck 30, with the alternative apparatus 200 in engagement with the cargo item 10. The alternative apparatus 200 includes a rod 210, and engaging structure 220, and adjustable connecting structure 230, which are similar to the rod 110, the engaging structure 120, and the adjustable connecting structure 130 as described with respect to FIGS. 2-3. The alternative apparatus 200 includes a body 250 that defines an engaging surface 252 that is engageable with the cargo item 10, and is connected in a fixed relationship with respect to the rod 210, such as by a socket 254 that is formed on the body 250 opposite the engaging surface 252.

In operation, a user first places the cargo item 10 within the cargo area 20, such as the truck bed 32 of the pickup truck 30, with the cargo item 10 placed on the bed liner 34. The body 150 is pivoted to a desired angular orientation with respect to the rod 110. The adjustable connecting structure 130 is moved to the unclamped position, and the adjustable connecting structure 130 is rotated to place the adjustable connecting structure 130 and the engaging structure 120 in a desired rotational position with respect to the rod 110, thereby establishing a desired configuration for the apparatus 100, such as one of the first through fourth configurations as described with respect to FIGS. 4-7.

The engaging structure 120 of the apparatus 100 is placed within a groove from the plurality of grooves 36 of the bed liner 34. The engaging structure 120 and the adjustable connecting structure 130 are then moved axially along the rod 110 away from the body 150, such that pressure is applied to the cargo item 10 by the body 150, and the engaging structure 120 is brought into engagement with the bed liner 34 within the groove from the plurality of grooves 36. The adjustable connecting structure 130 is then moved from the unclamped position to the clamped position. Accordingly, the cargo item 10 is now in secure engagement with the body 150, such as being disposed between the body 150 and another structure such as portion of the truck bed 32 and/or the bed liner 34, or another cargo item, or another cargo securing apparatus such as the apparatus 100.

Operation of the alternative apparatus 200 shown in FIG. 8 is similar to operation of the apparatus 100, except that a configuration for the alternative apparatus 200 need not be established owing to the fixed connection of the body 250 with respect to the rod 210.

While the description relates to what are presently considered to be the most practical and preferred embodiments, it is to be understood various modifications or equivalent arrangements are included within the spirit and scope of the appended claims. The scope is to be accorded the broadest interpretation so as to encompass all such modifications and equivalent structures as is permitted under the law.

What is claimed is:

1. An apparatus for securing a cargo item, the apparatus comprising:
   a pickup truck bed;
   a bed liner disposed within the pickup truck bed, the bed liner defining a plurality of elongate grooves;
   a rod that extends along an axis in an axial direction of the rod and having a first end and a second end opposing the first end;

an engaging structure that is receivable within at least one groove from the plurality of elongate grooves of the bed liner for engagement with the bed liner;

an adjustable connecting structure for connecting the engaging structure adjacent to the first end of the rod and allowing adjustment of an axial position of the engaging structure along the rod in the axial direction of the rod; and a body connected adjacent to the second end of the rod for engaging the cargo item.

2. The apparatus of claim 1, further comprising:
a pivot joint for pivotally connecting the rod to the body, wherein the pivot joint allows pivoting of the body between at least a first angular position with respect to the rod and a second angular position with respect to the rod.

3. The apparatus of claim 2, wherein the body includes at least a first surface for engaging the cargo item and a second surface for engaging the cargo item, the first surface being positioned for engagement with the cargo item when the body is disposed in the first angular position with respect to the rod, and the second surface being positioned for engagement with the cargo item when the body is disposed in the second angular position with respect to the rod.

4. The apparatus of claim 1, wherein the adjustable connecting structure allows adjustment of a rotational position of the engaging structure with respect to the rod about the axis of the rod.

5. The apparatus of claim 1, wherein the adjustable connecting structure includes a clamping sleeve.

6. The apparatus of claim 5, wherein the clamping sleeve is moveable between a clamped position and an unclamped position with respect to the rod, wherein the axial position of the engaging structure with respect to the rod is fixed when the clamping sleeve is in the clamped position, and the axial position of the engaging structure with respect to the rod is not fixed when the clamping structure is in the unclamped position.

7. The apparatus of claim 1, wherein the engaging structure includes a bar that extends transverse to the axis of the rod.

8. The apparatus of claim 1, wherein the engaging structure includes a resilient material for engagement with the bed liner.

9. The apparatus of claim 1, wherein the engaging structure includes a bar that extends transverse to the axis of the rod and a resilient material disposed on the bar for engagement with the bed liner.

10. The apparatus of claim 1, wherein the body is substantially wedge-shaped.

11. The apparatus of claim 1, wherein the body is connected to the rod adjacent to a first end of the rod.

12. The apparatus of claim 1, wherein the body is connected to the rod in a fixed relationship with respect to the rod.

13. The apparatus of claim 1, further comprising:
a pivot joint that includes an axle for pivotally connecting the rod to the body, wherein the pivot joint allows pivoting of the body between at least a first angular position with respect to the rod and a second angular position with respect to the rod.

14. The apparatus of claim 13, wherein the body is substantially wedge-shaped and includes at least a first surface for engaging the cargo item and a second surface for engaging the cargo item, the first surface being positioned for engagement with the cargo item when the body is disposed in the first angular position with respect to the rod, and the second surface being positioned for engagement with the cargo item when the body is disposed in the second angular position with respect to the rod.

15. An apparatus for securing a cargo item within a cargo area that is defined by a pickup truck bed and a bed liner that is disposed within the pickup truck bed, the bed liner defining a plurality of elongate grooves, the apparatus comprising:
a rod that extends along an axis in an axial direction of the rod;
an engaging structure that is receivable within at least one groove from the plurality of elongate grooves of the bed liner for engagement with the bed liner;
a clamping sleeve for connecting the engaging structure to the rod, the clamping sleeve moveable between a clamped position and an unclamped position with respect to the rod, wherein an axial position of the engaging structure with respect to the rod along the axis of the rod and a rotational position of the engaging structure with respect to the rod about the axis of the rod are fixed when the clamping sleeve is in the clamped position, and the axial position of the engaging structure with respect to the rod and the rotational position of the engaging structure with respect to the rod are not fixed when the clamping sleeve is in the unclamped position such that the clamping sleeve is slidable along the rod and rotatable on the rod; and
a body connected to the rod for engaging the cargo item.

16. The apparatus of claim 15, further comprising:
a pivot joint that includes an axle for pivotally connecting the rod to the body, wherein the pivot joint allows pivoting of the body between at least a first angular position with respect to the rod and a second angular position with respect to the rod.

17. The apparatus of claim 16, wherein the body is substantially wedge-shaped and includes at least a first surface for engaging the cargo item and a second surface for engaging the cargo item, the first surface being positioned for engagement with the cargo item when the body is disposed in the first angular position with respect to the rod, and the second surface being positioned for engagement with the cargo item when the body is disposed in the second angular position with respect to the rod.

18. The apparatus of claim 15, wherein the engaging structure includes a bar that extends transverse to the axis of the rod and a resilient material disposed on the bar for engagement with the bed liner.

* * * * *